March 26, 1929. T. W. HICKS 1,706,573
TILLER
Filed March 29, 1923 2 Sheets-Sheet 1

Inventor
T. W. Hicks
By Axel L. Browning
Attorney

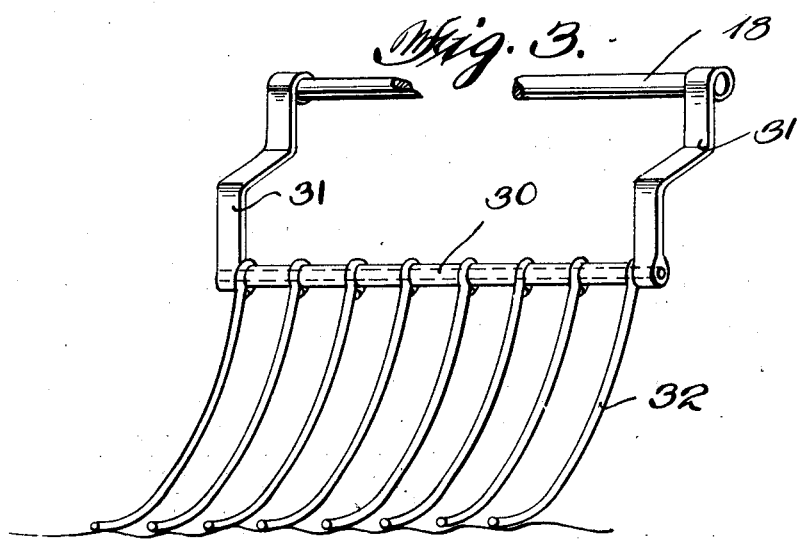
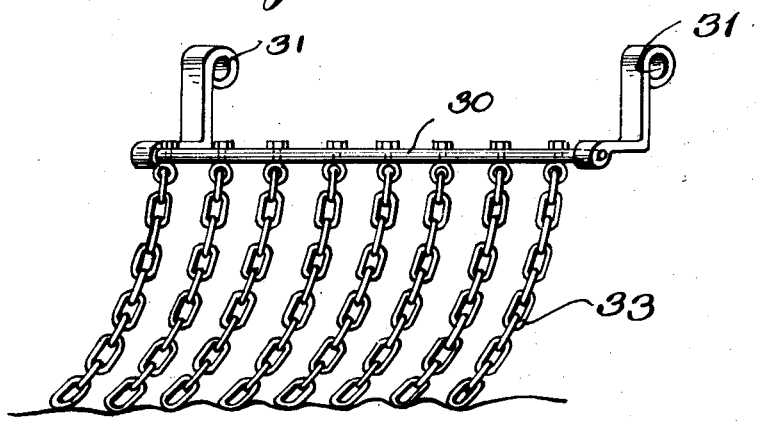

Patented Mar. 26, 1929.

1,706,573

UNITED STATES PATENT OFFICE.

THOMAS W. HICKS, OF MINNEAPOLIS, MINNESOTA.

TILLER.

Application filed March 29, 1923. Serial No. 628,650.

This invention relates to improvements in tillers and more particularly to that general type of tiller illustrated and described in my prior United States Patent No. 1,320,469, dated November 4, 1919.

This present form of tiller contemplates the use of a plow provided with the customary mold-board and in operative relation thereto is positioned a substantially vertically disposed tiller shaft yieldably mountable whereby it may be swung towards the plow as circumstances may require. The tiller shaft is provided with radially disposed blades which are rotated at a relatively high rate of speed to thoroughly pulverize and disintegrate the furrow slice as it is turned by the mold-board. In order to prevent scattering of the earth and also to bury the surface trash, such as roots and stalks, the present invention also contemplates the use of a shield provided with trash burying means whereby as the tiller moves over the ground the soil is thoroughly pulverized and the litter and trash buried beneath the surface, and, thereby, to a certain extent, more efficiently fertilize the ground.

In view of this brief statement of the invention, one of the objects thereof is the provision of a simple and practical attachment for a tiller which will not only act as a guard for the tiller shaft, but also to a more or less extent smooth the ground and bury the weeds, stubble or other surface litter and thereby form a more perfect seed bed.

A further object is to provide a strong and durable device of the above general character which may be inexpensively manufactured and assembled and applied to the tillers now in general use without material modification or alteration of the other parts.

Other objects will be in part obvious from the annexed drawings and in part hereinafter pointed out in connection therewith in the following analysis of the invention.

The invention accordingly consists in the features of construction, the combination of parts, and in the unique relation of the various members and the relative proportioning and dispositioning thereof, all as more clearly outlined herein.

To enable others skilled in the art to fully comprehend the underlying features thereof in order that they may embody the same, by numerous modifications in structure and relation contemplated by this invention, drawings depicting the preferred forms of the invention have been annexed as part of this disclosure and in such drawings like characters of reference indicate corresponding parts throughout all the views, of which—

Fig. 3 is a detail view of a modified form of screen; and

Fig. 4 is a similar view showing a still further modified form of screen or shield.

Figure 1:
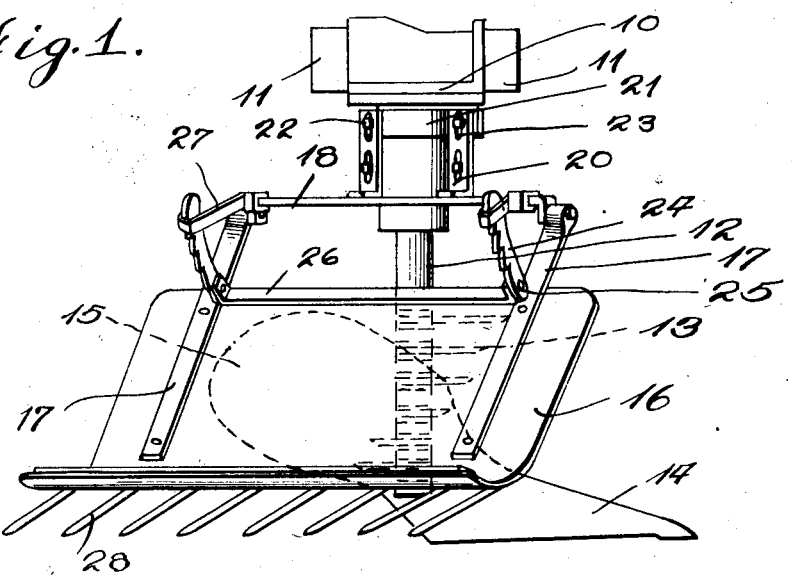
Figure 1 is an elevational view of such parts of the complete apparatus necessary to fully understand the invention.
Figure 2:
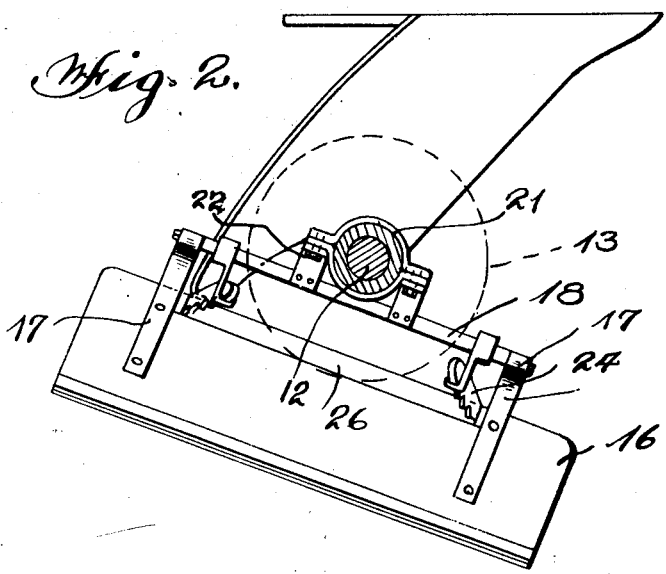
Fig. 2 is a plan view thereof.

Referring now to the drawings in detail and more particularly to Fig. 1, 10 indicates a housing for the tiller shaft provided with trunnions 11, which housing is adapted to be mounted and supported from any desired part of the frame of the plow or machine. Positioned within this housing is a tiller shaft 12 which is rotated through any desired form of power transmitting mechanism, which in turn is driven by a suitable source of power carried by the plow. This shaft 12 carries a plurality of radially disposed arms or blades 13 which are adapted to engage the furrow while in a semi-suspended position after being turned by a plow 14 and mold board 15, to thereby thoroughly pulverize and disintegrate the same in the manner described in my above referred to patent. Inasmuch as the tiller shaft 12 revolves at a rate of speed approximating several hundred revolutions per minute, there is a decided tendency for the dirt, and particularly the surface trash which usually is formed of chopped-up weeds, roots, stubble and the like, to be whirled in a suspended state. This surface trash, being generally lighter than the dirt, tends to remain in a semi-suspended relation for a longer time than the pulverized earth and consequently falls on the upper surface of the seed bed. If it can be easily and effectively buried beneath the top of the soil, it is gradually decomposed and acts in a way as a fertilizer, thereby producing a more efficient and perfect seed bed.

In order to accomplish this object, there is positioned, adjacent the disintegrator, a shield 16 carried by brackets 17 pivotally supported from each end of a rod 18 or the like. This rod may be carried by L-shaped brackets 20 adjustably secured, by means of bolts or other suitable fastening means 22 passing through slots 23, to a sleeve-like member 21 which surrounds the housing 10. By the adjustment of these bolts in the slots 23, the brackets 20 may be raised or lowered relatively to the disintegrator 12. Likewise, by loosening the nuts 22, the entire shield may be adjusted angularly with respect to the tiller shaft.

A further adjustment may be obtained by means of racks 24 pivoted at 25 to a transverse bar 26, along the upper edge of the shield 16. These racks are adapted to co-act with detents or holding devices 27 mounted upon the bar 18. Thus, by raising the lower edge of the shield 16, its angular relation with respect to the tiller is altered as desired, and it will remain in adjusted position. Furthermore, if a stone or stump is encountered, the shield will swing upwardly about its pivotal supports allowing the obstruction to pass.

Particular attention is directed to the trash burying fingers 28 located at a position along the lower edge of the shield. The weight of the shield and these fingers will cause the surface trash and litter above mentioned to be buried just beneath the soil of the surface. They also provide or form grooves in the upper surface of the seed bed, giving the same an undulating appearance, thereby more efficiently and effectively retaining moisture, and also preventing drifting of the soil if it is particularly fine and dry, as occurs in certain localities in the country.

From the above it will be seen that this embodiment of the invention comprises a most efficient and reliable attachment for tillers in the form of a shield and trash burying implement. The construction, which involves relatively few parts, may be very inexpensively manufactured and assembled and installed on tillers now in use without material alterations of any of the other parts, it being only necessary to clamp the sleeve-like member 21 about the lower part of the housing 10.

The modification shown in Fig. 3 is of more or less similar construction and adapted to accomplish substantially the same purpose. In this embodiment, a single bar 30 extends between two brackets 31 which are adapted to be secured or mounted upon the rod 18. Upon this bar 30 are a plurality of relatively heavy arms 32 which are loosely mounted so far as the bar 30 is concerned, thus having a certain radial and lateral movement, and at the same time, being of sufficient weight to bury the surface trash and litter that may be produced by the disintegrator. The space between these rods will permit passage of a portion of the tilled earth, while other parts of it will be retained and immediately drop ahead of the rods, thereby facilitating the burying of a large part of the weeds, stubble or other surface litter. The rods, being loosely hinged to the horizontal support 18 are subject to play and vibration, which movment in turn prevents the piling up of the moist soil or surface litter thereon.

The form shown in Fig. 4 is very similar to that above described in connection with Fig. 3, except that in this case, the rod 30 is provided with a plurality of flexible or chain-like shield members 33, which operate in a manner similar to the iron rods 32 above described.

It will thus be seen that the present invention contemplates a simple and practical construction well adapted to accomplish among others all of the objects and advantages herein set forth.

Without further analysis, the foregoing will so fully reveal the gist of this invention that others can, by applying current knowledge, readily adapt it for various applications without omitting certain features that from the standpoint of the prior art fairly constitute essential characteristics of the generic or specific aspects of this invention and, therefore, such adaptations should and are intended to be comprehended within the meaning and range of equivalency of the following claims.

What I claim is:

1. In an apparatus of the character described, the combination of a plow, a rotary tiller having a substantially upright shaft arranged adjacent to the plow, and a shield adjustably mounted upon the tiller shaft and so shaped as to direct material thrown from the tiller downwardly and outwardly from the plow.

2. In an apparatus of the character described, the combination of a plow, a rotary tiller having a substantially upright shaft arranged adjacent to the plow, and a shield adjustably mounted upon the tiller shaft and so shaped as to direct material thrown from the tiller downwardly and outwardly from the plow, said shield being formed with a plurality of spaced apart fingers.

3. In an apparatus of the character described, the combination of a plow, a rotary tiller having a substantially upright shaft arranged adjacent to the plow, and a shield adjustably mounted upon the tiller shaft and capable of being adjusted both vertically and axially, and so shaped as to direct material thrown from the tiller downwardly and outwardly from the plow.

In testimony whereof I affix my signature.

THOMAS W. HICKS.